Sept. 1, 1925.
C. BERSANO
1,551,789
ANTISKID DEVICE
Filed March 7, 1925
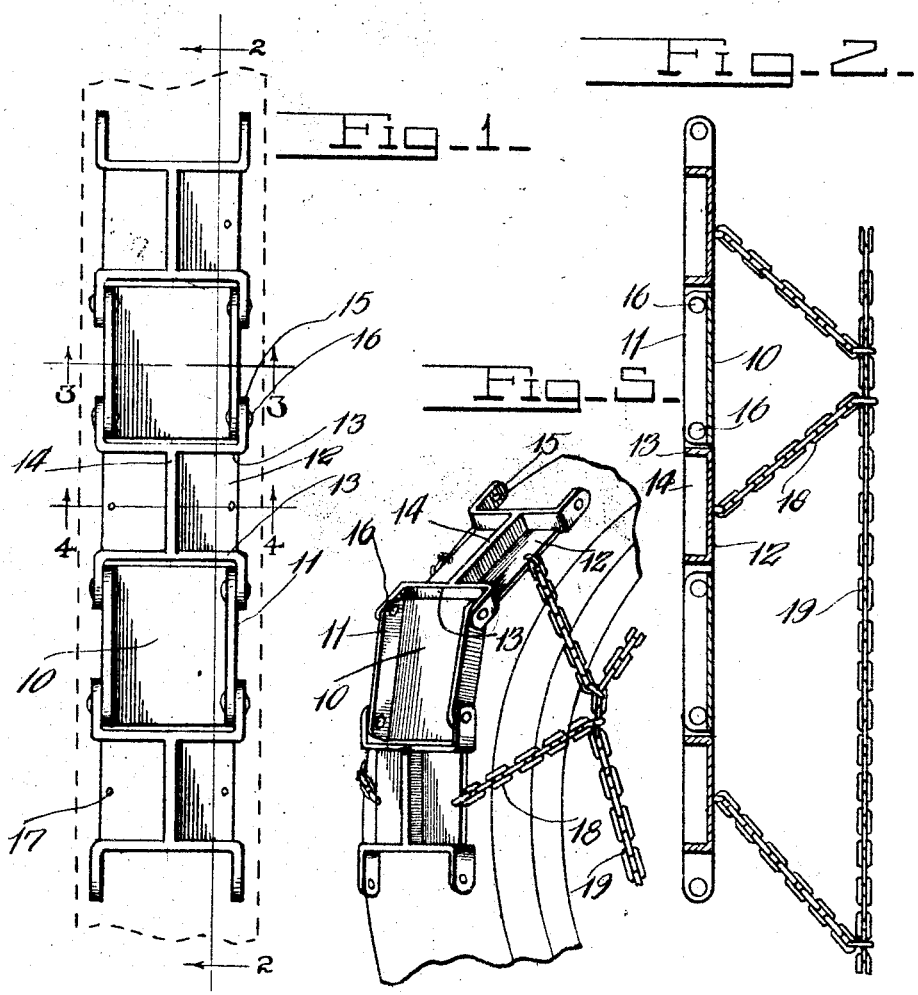
INVENTOR.
Charles Bersano
BY Clarkson
ATTORNEYS.

Patented Sept. 1, 1925.

1,551,789

UNITED STATES PATENT OFFICE.

CHARLES BERSANO, OF JOLIET, ILLINOIS.

ANTISKID DEVICE.

Application filed March 7, 1925. Serial No. 13,778.

*To all whom it may concern:*

Be it known that CHARLES BERSANO, citizen of the United States, residing at Joliet, in the county of Will and State of Illinois, has invented certain new and useful Improvements in Antiskid Devices, of which the following is a specification.

This invention relates to anti-skid devices adapted especially for use on the wheels of automobiles and other like vehicles having pneumatic tires.

One important object of the invention is to provide an improved anti-skidding device which is so arranged as to do away with the objectionable bumping produced by the ordinary chains commonly used for this purpose, the improved device being of such character that a continuous smooth rolling contact is produced by the ground engaging parts of the invention.

A second important object of the invention is to provide an improved form of antiskidding device which is so designed that the pneumatic tire is engaged by the anti-skid elements of the device in a substantially continuous peripheral engagement so that wear and damage to the tire by the use of antiskid means is eliminated.

A third important object of the invention is to provide an improved anti-skidding device of this character having ground engaging cups or recesses so arranged that they automatically free themselves from any mud, snow, ice or the like that may accumulate therein in use, the freeing action being produced by the change of shape of the pneumatic tire as different parts thereof are brought under pressure through contact with the ground and then freed from such pressure.

A fourth important object of the invention is to provide a device of this character having links provided with upstanding ribs, the ribs on the several links being so connected as to mutually brace each other against distortion.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a plan view of a portion of the chain showing several of the links in flattened position.

Figure 2 is a section on the line 2—2 of Figure 1.

Figure 3 is a section on the line 3—3 of Figure 1.

Figure 4 is a section on the line 4—4 of Figure 1.

Figure 5 is a perspective view of a portion of a pneumatic tire and the device in position thereon.

Figure 6 is a perspective view of a modified form of link used herewith.

The main or tread portion of the device consists of an endless circular series of links, the circle being of proper diameter to fit snugly on the size of tire for which the device is intended. These links are of two kinds alternately arranged.

One type or kind of link consists of a base plate 10 having its side edges 11 upturned at right angles to the base plate. These edges or flanges 11 are of the same length as the base plate and are provided, adjacent their ends with suitable openings for the reception of rivets as will be presently explained.

The other type of link consists of a base plate 12 having at its transverse or end edges upstanding ribs or flanges 13, the middle points of which are connected by a longitudinally extending rib 14. The ends 15 of the ribs or flanges 13 extend beyond the plate 12, being bent to extend parallel to the rib 14 and positioned to lie against the outer faces of the ribs 11 of adjacent links. These ends are provided with suitable openings registering with the openings in the ribs 11 and through the registering openings extend pivot rivets 16. All of the ribs or flanges are of uniform height so that, the device being in position on the tire, there is formed a substantially continuous ground contacting surface of such character that, when passing over a hard pavement no jarring or jolting will be experienced.

Each of the base plates 12 is provided with openings 17 adjacent the centers of its side edges and in these openings are secured the ends of short lengths of chain 18 having their remaining ends secured to a holding or retaining chain 19 having its ends connected in the usual manner by a fastener or chain latch (not shown). These chains 19 are, of course shorter than the thread portion of the device so that, when the ends of one chain are separated, the device may be slipped laterally on the wheel and the chain refastened, thus holding the tread securely in position. The link 12 may be modified (as shown in Figure 6) by the provision of ears 10ª having apertures 10ᵇ at its sides to enable the chains 18 to be secured.

It will be noted that the combination of longitudinal and transverse ribs prevents slipping of the wheel circumferentially and skidding side ways. The device thus combines a traction and anti-skid means.

Again it will be seen that the tendency of the ribs 13 to bend under traction is resisted at the center by the ribs 14 and at the ends by the connection to the ribs 11. Correspondingly, tendency of the ribs 14 to bend side ways is resisted by the ribs 13 which also resist the side stresses on the ribs 11. Thus the whole system of ribs afford mutual support against all bending stresses in either circumferential or lateral directions.

Finally, the cells or pockets formed by the bases 10, side flanges 11 and end flanges 13 are of such character, due to the movement of the flanges 13 with respect to the bases 10, that the longitudinal dimensions of each cell will be least when the cell is in contact with the ground and greatest when the cell is moved off the ground by the rotation of the wheel. Owing to this any mud or ice which has become packed in the cell will be loosened and freed as the wheel revolves.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In a device of the kind described, a tread consisting of alternately arranged links secured together pivotally in a circular series, certain of said links consisting each of a base plate and lateral flanges, and alternate links each consisting of a base plate having end flanges each provided with ears extending from the ends of said flanges longitudinally of the plate and engaging against the outsides of the lateral flanges of the first links, each second mentioned link also having the transverse flanges connected by a longitudinally extending rib, said ears and lateral flanges being connected by pivot rivets.

2. In a device of the kind described, a tread consisting of alternately arranged links secured together pivotally in a circular series, certain of said links consisting each of a base plate and lateral flanges, and alternate links each consisting of a base plate having end flanges each provided with ears extending from the ends of said flanges longitudinally of the plate and engaging against the outsides of the lateral flanges of the first links, each second mentioned link also having the transverse flanges connected by a longitudinally extending rib, said ears and lateral flanges being connected by pivot rivets, all of said ribs and flanges being of uniform height from the respective base plates.

In testimony whereof I affix my signature.

CHARLES BERSANO.